United States Patent [19]

Simonelli et al.

[11] Patent Number: 4,687,180
[45] Date of Patent: Aug. 18, 1987

[54] METERING VALVE

[75] Inventors: James K. Simonelli, Mentor; Gary W. Scheffel, Streetsboro, both of Ohio

[73] Assignee: Nupro Company, Willoughby, Ohio

[21] Appl. No.: 838,322

[22] Filed: Mar. 10, 1986

Related U.S. Application Data

[63] Continuation of Ser. No. 729,285, May 1, 1985, abandoned.

[51] Int. Cl.$^4$ .............................................. F16K 47/00
[52] U.S. Cl. .................................. 251/122; 251/205; 251/214; 251/900; 251/903
[58] Field of Search ............... 251/900, 903, 122, 205, 251/214, 225, 310; 137/454.5; 277/177

[56] References Cited

U.S. PATENT DOCUMENTS

| 2,593,193 | 4/1952 | Rockwell | 277/177 |
|---|---|---|---|
| 2,917,271 | 12/1959 | Banks | 251/122 |
| 2,980,392 | 4/1961 | Greenwood | 251/210 |
| 3,070,117 | 12/1962 | Callahan et al. | 251/205 |
| 3,086,749 | 4/1963 | Frye | 251/205 |
| 3,228,655 | 1/1966 | Weise | 251/122 |
| 3,280,836 | 10/1966 | Callahan, Jr. et al. | 137/614.21 |
| 3,410,521 | 11/1968 | Sowers, III et al. | 251/205 |
| 3,538,951 | 11/1970 | Bownass | 137/614.21 |
| 3,727,879 | 4/1973 | Lange et al. | 277/177 |
| 3,765,448 | 10/1973 | Dussia | 137/553 |
| 3,910,553 | 1/1979 | Boylan | 251/205 |
| 4,134,572 | 1/1979 | Schmidt | 251/122 |

FOREIGN PATENT DOCUMENTS 1515245 1/1968 France .
697388 1/1953 United Kingdom .

Primary Examiner—Samuel Scott
Assistant Examiner—Noah Kamen
Attorney, Agent, or Firm—Fay, Sharpe, Beall, Fagan, Minnich & McKee

[57] ABSTRACT

A metering valve having a one-piece bonnet for reducing problems resulting from tolerance stack up. A guide portion is included on the nose of the bonnet for cooperation with a valve body bore to ensure concentric alignment between the metering pin and its associated orifice. A pair of O-rings on the valve stem cooperate with the bonnet bore to absorb forces and substantially reduce the potential for galling and breakage of the metering pin. One of the O-rings is compressed to a substantially greater extent than the other to aid in achieving better alignment between the stem and bonnet, and to obtain a firmer feel.

10 Claims, 3 Drawing Figures

METERING VALVE

This is a continuation of co-pending application Ser. No. 729,285 filed on May 1, 1985, now abandoned.

BACKGROUND OF THE INVENTION

The subject invention is directed toward the valve art and, more particularly, to a metering valve having improved stability.

The invention is particularly suited for use in a needle type metering valve of the type used for controlling fine flows and will be described with particular reference thereto. However, as will become apparent, the inventive concept presented is capable of broader applications and use.

Valves used for metering fine flows typically comprise a needle member of metering pin carried at the end of a stem and adapted to enter a fluid flow orifice in a valve body between the fluid inlet and outlet. Generally, the stem is threadedly received in a multi-part bonnet member which, in turn, is threadedly secured to the body. Rotation of an associated handle imparts axial movement of the stem and needle member, and regulates fluid flow through the valve. An O-ring or the like is carried on the stem and assists a conventional stem packing for sealing purposes.

In recent years, a quality control study has determined that metering valves of this general type have been failing prematurely due to breakage and galling of the metering pin. It is desirable to extend the cycle life of the metering valves and retain high quality metering after repetitive use. A review of the valve designs found that improvements were obtainable in certain areas, e.g., better alignment of the metering pin in relation to the orifice, reduction of tolerance stacking, better force absorption, and the like. The variation in concentricity and tolerance stacking allowed the metering pin to rub the orifice side wall. This caused the metering pins to break or gall since the resulting forces could not be absorbed by the stem and bonnet assemblies.

A valve arrangement has, therefore, been considered desirable which would provide improved valve life and overcome the foregoing problems. The subject invention is deemed to meet these needs and others, and provides a new and improved metering valve construction.

SUMMARY OF THE INVENTION

According to the invention, a metering valve construction is provided which has a valve body including conventional inlet and outlet passageways communicating with a fluid flow orifice. A stem received in a unitary valve bonnet is selectively moveable axially thereof for, in turn, axially moving a metering pin the fluid flow orifice. Means for absorbing forces resulting from inadvertent contact between the metering pin and orifice is advantageously provided.

According to another aspect of the invention, the absorbing means preferably comprises a pair of resilient rings closely surrounding the exterior of the stem in the bonnet. The rings are in axial spaced relation to each other with the upper or guide ring spaced furthest from the metering pin being subjected to a much greater compression than the lower or seal ring. In the preferred construction, these rings are defined by O-rings.

In accordance with another aspect of the invention, a guide means is advantageously provided at one end of the bonnet for ensuring accurate alignment of the bonnet to the valve body which, in turn, ensures proper alignment of the metering pin to the orifice. A seal member also is situated between the exterior of the guide means and the valve body.

A principal advantage of the present invention is the provision of a metering valve which achieves better, more reliable concentricity between the metering pin and an associated orifice.

Another advantage of the invention resides in a structural arrangement which better protects the metering pin from various contact forces.

A further advantage of the invention is found in providing the bonnet with a guide means extension to facilitate centering of the metering pin in the valve body orifice.

Still further advantages and benefits of the subject invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings wherein.

DETAILED DESCRIPTION OF THE PREFERRED EMBODIMENT

Figure 1:
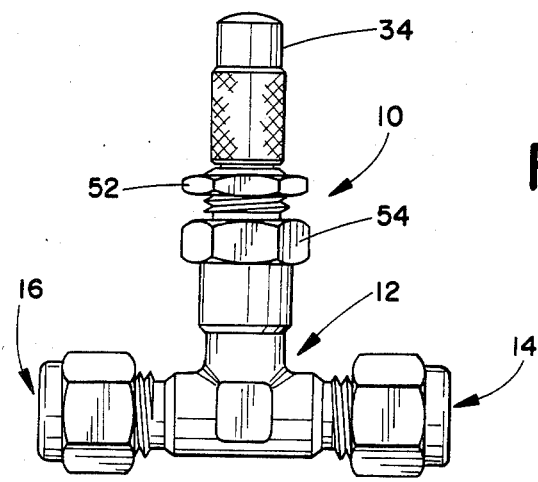
FIG. 1 is an elevational view of a metering valve.
Figure 2:
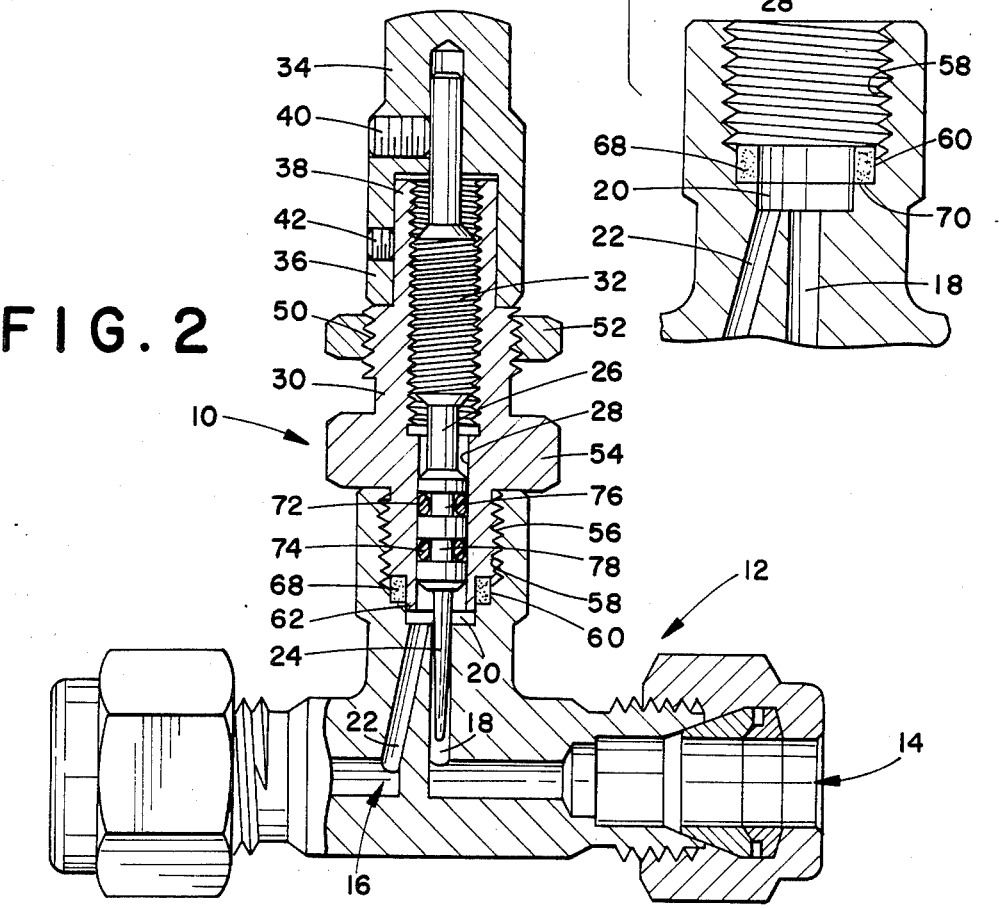
FIG. 2 is an enlarged cross-sectional view of the metering valve of FIG. 1 showing the cooperative relationship of the various components according to the invention; and, FIG. 3 is an enlarged, exploded cross-sectional view showing the lower portions of the stem and bonnet, and the upper portion of the valve body formed in accordance with the invention.

Referring now to the drawings wherein the showings are for purposes of illustrating the preferred embodiment of the invention only, and not for purposes of limiting same, FIGS. 1 and 2 show a metering valve 10 including a body portion 12 having an inlet passageway 14 and an outlet passageway 16. As shown, the inlet and outlet are in opposed axial aligment with each other. Swage type end fittings are received on the valve body in surrounding relation to the outer end areas of passageways 14, 16 to facilitate ready installation of the valve in an associated fluid system. It is to be appreciated, however, that a variety of other end fitting connections could also be suitably employed.

An elongated orifice 18 extends generally normal to inlet and outlet passageways 14, 16 and has the opposed ends thereof in fluid communication with the inlet passageway and an enlarged bore 20. The outlet 16 also communicates with bore 20 by means of an angled passage 22. Fluid may thus flow through inlet 14, orifice 18, bore 20, and exit via passage 22 and outlet 16.

Fluid flow through the valve is controlled by a small, delicate, tapered metering pin or needle 24 carried at the lower end of an elongated stem member 26. Axial movement of the stem 26 moves the tapered metering pin axially into and out of the orifice 18, thereby varying the annular flow area between the metering pin and orifice as is known in the valve art.

Stem 26 is threadedly engaged in a central bore 28 of a unitary or one-piece bonnet member 30 at mating threaded areas generally designated by numeral 32 located remote from the tapered metering pin 24. The stem extends outwardly from the outer end of the bonnet and receives a generally cylindrical adjusting handle 34. Handle 34 has a downwardly extending, open cylindrical boot portion 36 which encloses an outer portion 38 of the bonnet. The adjusting handle is nonrotatably connected to the stem by convenient means such as a set screw 40 or the like. Manual rotation of the handle thus imparts rotary movement to the stem for axially shifting metering pin 24 in orifice 18 for adjusting the rate of fluid flow through the valve.

A second set screw 42 is provided in the boot portion 36 of the handle. Advancement of this second set screw locks the handle and stem in a predetermined position, thereby maintaining fluid flow through the valve at a constant rate. Loosening the set screw 42 allows variable flow metering by adjusting the handle.

Although not critial to the subject invention, bonnet 30 has an exteriorly threaded portion 50 for receiving a panel mounting nut 52. This provides secure mounting of the assembly as is known in the art. Located adjacent to threads 50 is a radially outward extending polygonal flange 54 defining wrench flats which facilitate removal of the bonnet from the valve body 12.

Figure 3:
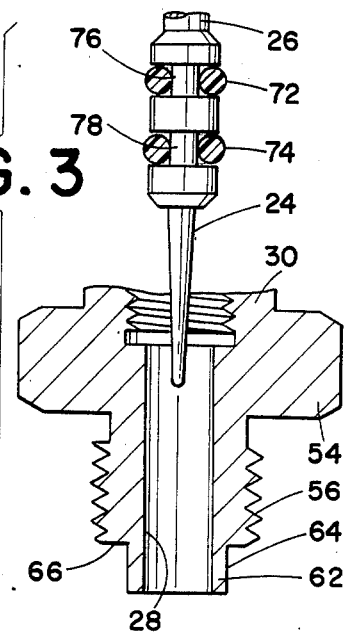

Referring also to FIG. 3, the lower end of the bonnet is provided with external threads 56 cooperable with an enlarged, threaded bore 58 extending into the valve body coaxial with bore 20. In addition, bore 58 has an unthreaded section 60 disposed axially adjacent bore 20.

Projecting axially outward from the nose end of the bonnet 30 is a cylindrical guide means 62. The outer surface 64 of guide means 62 is smoothly finished, and is spaced radially inward of threaded area 56 for closely received, aligning engagement with bore 20 (FIG. 2). A seal confining shoulder 66 is defined between threaded area 56 and outer surface 64.

An annular body seal 68 is closely interposed between the outer surface 64 of the guide means and the side wall of bore 60 in valve body 12. As seen in FIGS. 2 and 3, the body seal 68 rests on a radial shoulder 70 defined at the interface between bores 60 and 20. Seal 68 functions to provide a fluid tight seal between the body and bonnet when these components are placed in a fully assembled relationship. As the bonnet is threaded into bore 58, shoulders 66, 70 axially compress the body seal so that it radially expands to form a fluid tight seal between guide means outer surface 64 and the side wall of bore 60.

Stem 26 is provided with a pair of axially spaced O-rings 72, 74 received in corresponding stem grooves 76, 78, respectively. The O-rings provide a floating capability to the stem. Thus, when metering pin 24 comes into contact with the side wall of orifice 18, the force of such contact is appropriately dissipated, and concentric alignment between the metering pin and orifice is retained. Such capability greater decreases the chances of galling or breaking the metering pin. In addition, the pair of O-rings prevent system fluid bypass between the stem and bonnet, and eliminate the need for additional stem packing structure.

According to the invention, the upper O-ring 72 is squeezed or compressed more tightly than lower O-ring 74. In fact, O-ring 72 is compressed to an extent which is greater than that recommended by the O-ring manufacturer for normal use. In the preferred embodiment here being described, O-ring 72 experiences a compression which is approximately twice the recommended compression. Such compression may readily be achieved by proper selection of the O-ring and proper dimensioning of groove 76.

To assemble the valve, stem 26 is threaded into the bonnet. The threaded engagement at area 32 provides a secure mounted relationship between the stem and bonnet. The unitary or one-piece bonnet 30 is then threaded into the valve body 12. External threads 56 interact with threaded bore 58 to retain the bonnet within the valve body. The use of a one-piece bonnet eliminates undesirable tolerance stacking between these two mating parts.

By way of example, prior art devices use a two-piece bonnet to facilitate assembly of the valve. The first bonnet piece is threaded into engagement with the second bonnet piece. Because of this construction, there are some dimensional deviations in the bonnet component due to acceptable tolerances within the individual pieces. When the composite bonnet is, in turn, threaded into engagement with an associated valve body, still other dimensional deviations will occur. The combination of these deviations results in an assembly with greater overall tolerance problems, ie., tolerance stacking. Use of the subject new one-piece bonnet advantageously decreases the foregoing tolerance stacking situation.

Also, centering of the stem with metering pin 24 coaxially disposed in orifice 18 occurs on guide means 62, and not on bonnet threads 56 as had heretofore been the case. Guide means 62 extends into close guiding contact with bore 20 for ensuring alignment of the metering pin 24 in the orifice. Reliance is not made solely on the threaded interconnection between the bonnet and valve body for effective centering of the metering pin. Body seal 68 is compressed between the smooth outer face 64 of the guide means and bore portion 60. Shoulder area 66 axially compresses and causes radial expansion of body seal 68 into a tight sealing condition when the bonnet is theadedly mounted to the valve body.

Handle 34 is then located over the outer end of stem 26 and bonnet outer portion 38. Set screw 40 is advanced into retaining contact with the stem so that subsequent handle rotation effects stem rotation with corresponding axial movement. Such axial movement accommodates adjustment of metering pin 24 in orifice 18 for controlling fluid flow through the valve. Set screw 42 is also inserted in the boot portion 36 of the handle for accommodating selective locking of the handle to bonnet outer portion 38.

Inadvertent contact of the metering pin with the sidewall of the orifice generates forces which, necessarily, pass through the delicate metering pin. As alluded to above, breakage of the pin, or at least galling thereof, was the usual result. With the subject invention these deficiencies are eliminated or reduced.

Compression of the outermost O-ring 72 is significantly above, approximately twice, the manufacturer's recommendation in order to provide a more stable structure. It is to be appreciated, however, that other compression relationships may be suitably employed to accommodate other valve constructions and environments without departing from the overall intent or scope of the invention. Thus, the double O-rings 72, 74 allow the stem to float, retain a stable valve structure, and prevent fluid leakage between the stem and bonnet.

In the preferred embodiment, the bonnet, valve handle, and panel nut body are constructed of stainless steel. The stem is also constructed of stainless steel but preferably of a different grade. The body seal and O-rings are of a resilient material with VITON, a registered trademark of E. I. DuPont de Nemours & Co., having been used with success. A wide range of other materials may advantageously be used to accommodate a variety of valve applications and environments without departing from the scope and intent of the subject invention.

Comparative tests have established that increased stability is realized with the subject new metering valve design. In addition, use of a pair of O-rings eliminates the need for a stem packing which, in turn, dispenses with packing adjustment. The stem packing was a source of other problems in prior art devices. The delicate metering pin 24 was unable to deform the stiff packing material when misalignment was present. The addition of a second O-ring to the subject invention retains a double stem seal and provides a smooth, stable stroke. Moreover, stem damage due to misalignment which is prevalent in the prior art assemblies is greatly reduced. The plural O-rings allow the stem to float while providing a valve stabilizing effect. This results in a longer cycle life for the valve, as well as the use of fewer component parts. The various tests directed to flow range, stability, and cycle life of the subject new valve indicate a more linear response between the flow range and the valve turns of the handle. Better low end metering is also obtained in addition to a lower dead stop setting and a more consistent number of turns at full open.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A metering valve comprising:
   a body having an inlet, an outlet, a first bore, and an orifice disposed intermediate said inlet and said outlet in coaxial communication with said first bore;
   a counterbore in said body of greater dimension than said first bore;
   a unitary bonnet threadedly received in said counterbore and having a passage therethrough defining a side wall;
   a smooth faced cylindrical guide means integral with said bonnet so as to extend axially outward from an inner end thereof;
   a stem threadedly received in said bonnet passage;
   a metering pin extending coaxially outward from an inner end of said stem for selective axial movement in said orifice; and,
   means received on the exterior of said stem in communication with the side wall of said bonnet passage for absorbing forces caused by contact between said metering pin and a side wall of said orifice and for allowing said stem to float in said bonnet passage, said force absorbing means including first and second O-rings at axially spaced locations on said stem with said first O-ring positioned axially outwardly of said second O-ring relative to said inner end of said stem and with said O-rings being placed in compression intermediate said stem and side wall of said bonnet passage in the absence of any fluid pressure, each said O-ring having a predetermined manufacturer compression recommendation for normal service use with said first O-ring being compressed to approximately twice the said manufacturer compression recommendation.

2. The metering valve as defined in claim 1 wherein said metering pin tapers inwardly from adjacent said stem to a metering pin outermost end.

3. The metering valve as defined in claim 1 further including a body seal interposed between said guide means and said body.

4. A metering valve comprising:
   a valve body having an inlet and an outlet, an orifice communicating with said inlet, a first bore communicating with said orifice, a passage communicating with said outlet and said first bore, and a second enlarged bore coaxial with said first bore;
   a bonnet threadedly received in said second bore and having a through passage disposed coaxially with said orifice, guide means at an inner end of said bonnet for guiding communication with said valve body first bore;
   a body seal interposed between said guide means and said second bore; and,
   a stem threadedly received in said bonnet through passage, first and second O-rings axially spaced apart on said stem and operatively engaging the side wall of said bonnet passage for floating said stem in said bonnet, said O-rings having a predetermined manufacturer compression recommendation with said O-rings being compressed in the absence of fluid pressure, one of said O-rings being compresed in the absence of fluid pressure to a level substantially above said predetermined manufacturer compression recommendation, a metering pin extending coaxially outward from an inner end of said stem adapted for axial movement in said orifice for selectively controlling fluid flow through said valve, said guide means and O-rings acting to reduce galling and breaking of said metering pin resulting from contact with the side wall of said orifice.

5. The metering valve as defined in claim 4 wherein said metering pin has a tapered conformation substantially over the lenth thereof from adjacent said stem.

6. The metering valve as defined in claim 4 wherein the O-ring space furthest from said metering pin is compressed to a greater extent than the other O-ring.

7. A metering valve comprising:
   a body having inlet and outlet passageways;
   an orifice interposed between said inlet and outlet passageways in said body for accommodating fluid flow therebetween;
   a stem having inner and outer ends;
   a metering pin extending coaxially from said stem inner end and being axially shiftable in said orifice for regulating fluid flow from said inlet passageway to said outlet passageway;
   a unitary bonnet secured to said body and having said stem threadedly connected thereto, selective rotation of said stem causing axial shifting of said metering pin relative to said orifice; and,
   means interposed between said stem and bonnet for absorbing forces caused by said metering pin contacting the side wall of said orifice, said force absorbing means including a pair of resilient rings compressed in the absence of fluid pressure in a manner such that one of said rings is subjected to a compression level in the absence of fluid pressure substantially above a predetermined manufacturer compression recommendation level and substantially greater than the other ring.

8. The metering valve as defined in claim 7 wherein said bonnet has a guide means extending coaxially outward therefrom and a first shoulder extending radially outward from said guide means, said body having first and second coaxial bores interconnected by a second shoulder with a portion of said guide means being closely received in said first bore, and a body seal member axially interposed between said guide means and said second bore.

9. A metering valve comprising:
a body having inlet and outlet passageways;
an orifice interposed between said inlet and outlet passageways in said body for accommodating fluid flow therebetween;
a stem having inner and outer ends;
a metering pin extending outwardly from said stem inner end and being axially shiftable in said orifice for regulating fluid flow between said inlet and outlet passageways;
a bonnet secured to said body and having said stem threadedly connected thereto, selective rotation of said stem causing axial shifting of said metering pin relative to said orifice; and,
means interposed between said stem and bonnet for absorbing forces caused by said metering pin contacting a side wall of said orifice, said force absorbing means including first and second resilient members at axially spaced locations along said stem, said first resilient member positioned axially outward of said second resilient member relative to said stem inner end, said first resilient member being compressed to approximately twice a manufacturer compression recommendation and subjected to substantially greater compression in the absence of fluid pressure than the second resilient member.

10. The metering valve as defined in claim 9 wherein said resilient members having a predetermined manufacturer compression recommendation and said one of said first and second resilient members being compressed to approximately twice the manufactuer recommendation.

* * * * *